United States Patent
Dill et al.

[11] 3,862,360
[45] Jan. 21, 1975

[54] LIQUID CRYSTAL DISPLAY SYSTEM WITH INTEGRATED SIGNAL STORAGE CIRCUITRY

[75] Inventors: Hans G. Dill, Costa Mesa; Michael N. Ernstoff, Los Angeles; Ronald M. Finnila, Costa Mesa; William C. Hoffman, Torrance; Alex M. Leupp, Newport Beach; Richard N. Winner, Palos Verdes Peninsula, all of Calif.

[73] Assignee: Hughes Aircraft Company, Culver City, Calif.

[22] Filed: Apr. 18, 1973

[21] Appl. No.: 352,397

[52] U.S. Cl.... 178/7.3 D, 315/169 TV, 350/160 LC
[51] Int. Cl. ............................................. H04n 5/66
[58] Field of Search ........... 178/7.3 D; 315/169 TV; 350/160 LC; 340/166 R

[56] References Cited
UNITED STATES PATENTS
3,765,011 10/1973 Sawyer et al. .................... 178/7.3 D OTHER PUBLICATIONS
"Liquid Crystal Matrix Displays," by B. J. Lechner et al., Proc. IEEE Vol. 59, No. 11, November, 1971, pp. 1,566–1,579.

*Primary Examiner*—Robert L. Griffin
*Assistant Examiner*—George G. Stellar
*Attorney, Agent, or Firm*—W. H. MacAllister, Jr.; Lawrence V. Link, Jr.

[57] ABSTRACT

Liquid crystal display systems having display panels in which a matrix array of reflective electrodes, as well as the individual addressing circuitry (field effect transistor) and electrical storage circuitry (capacitor) for each cell of the display panel, are formed on semiconductor backplates such that each reflective electrode forms one element or plate of the capacitor for the corresponding cell. Each field effect transistor is utilized to address an associated element of the matrix array, and the associated storage capacitor maintains the applied potential across the liquid crystal cell for a period sufficient for scattering centers to be formed in the liquid crystal material.

6 Claims, 10 Drawing Figures

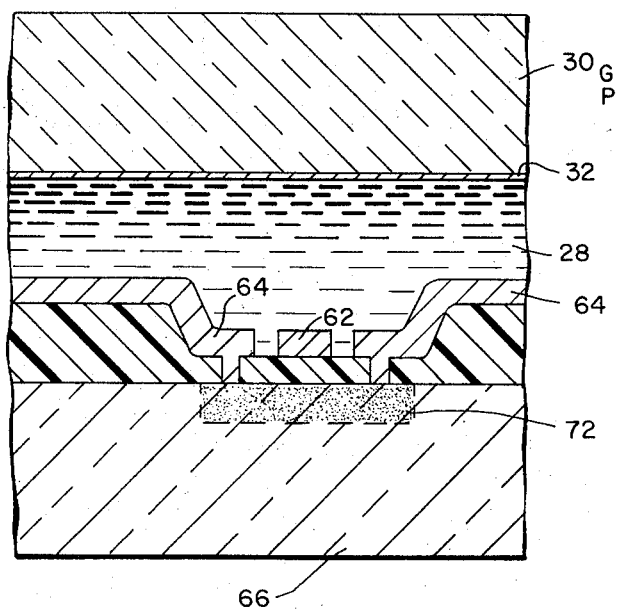
Fig. 3.
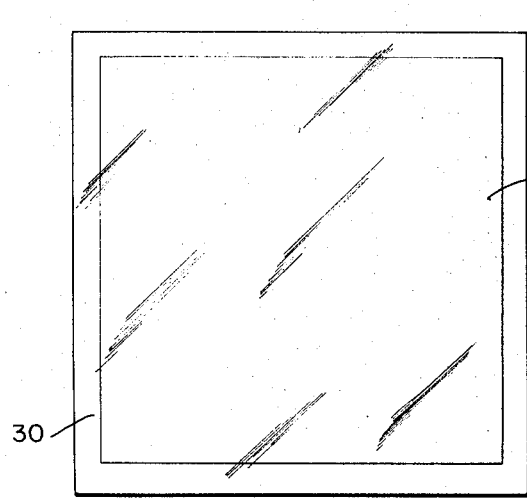
Fig. 4.
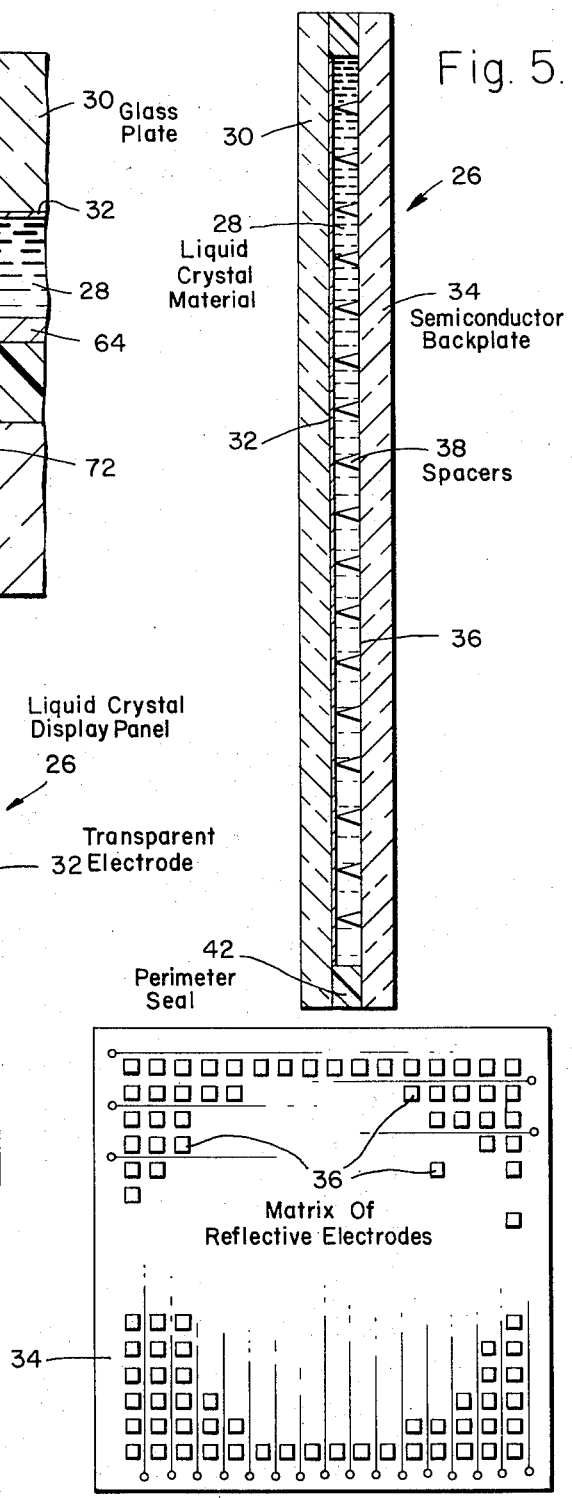
Fig. 5.
Fig. 6.

LIQUID CRYSTAL DISPLAY SYSTEM WITH INTEGRATED SIGNAL STORAGE CIRCUITRY

BACKGROUND OF THE INVENTION

This invention relates to liquid crystal display systems and particularly to such systems which comprise an array of individually addressable electrodes formed on a semiconductor back plate.

One type of liquid crystal display system comprises a plurality of individually addressable cells arranged in a matrix array with each of the elemental cells of the array operating as a reflective light valve. In the absence of applied potential, the liquid crystal material is clear and substantially all the incident light is reflected away from a viewing area and the cell appears dark to an observer. When electric potential above a threshold level is applied across the liquid crystal material, the material scatters the light, much like a piece of frosted glass, and the cell appears white to the observer. The percentage of incident light which is scattered towards the viewing area is proportional to the magnitude of the potential applied to the liquid crystal cell, and consequently gray level display presentations may be produced.

In high resolution display systems a composite presentation is built up from thousands of individually controllable elemental liquid crystal cells, each of which must be updated (the potential across the cell reprogrammed) at a rate sufficiently high to prevent observable flicker in the presentation. Certain liquid crystal materials having otherwise favorable characterisitics for display applications exhibit a delay period (such as 5 milliseconds, for example) between the time an electric potential is applied across the liquid crystal cell and the formation of scattering centers within the cell. Hence, rapid sequential addressing of the individual elements of a matrix display requires that an electrical storage element be provided for each of the elemental cells. For arrays having resolution as high as 100 lines/inch to be practical devices, the addressing and signal storage circuitry required for each of the large number of elemental cells, must be capable of fabrication within reasonable cost and volume restraints; and the resulting system must be highly reliable and have an extended operational life.

SUMMARY OF THE INVENTION

It is therefore an object of the subject invention to provide an improved liquid crystal display system.

Another object is to provide the circuitry and fabrication techniques which make it practical to produce high resolution liquid crystal display panels that may be programmed at a high rate.

A further object is to provide the circuitry and fabrication techniques for forming the addressing circuitry and the electrical storage element associated with each elemental cell of the array on the semiconductor back plate of the display panel.

Another object is to provide the configuration and method whereby a portion of the storage element for each of the individual liquid crystal cells may be reliably fabricated by ion implantation techniques.

Liquid crystal display systems in accordance with the subject invention are fabricated by sandwiching a thin layer of liquid crystal material between a glass plate having a transparent electrode, and a back plate having a matrix array of reflective electrodes formed on a semiconductor wafer. The back plate also contains the individual addressing circuitry (field effect transistor) and electrical storage circuitry (capacitor) disposed contiguous to the reflective liquid crystal contact electrode for each cell, with the reflective electrode forming one element or plate of the capacitor. Each field effect transistor is utilized to address an associated element of the matrix array, and the associated storage capacitor maintains the applied potential across the liquid crystal cell for a period sufficient for scattering centers to be formed in the liquid crystal material.

In accordance with one embodiment of the subject invention, one element (plate) of each storage capacitor is formed on the semiconductor back plate by ion implantation. This permits very precise control of the depth and area of semiconductor doping, and makes possible large scale component fabrication with a minimum of defects.

BRIEF DESCRIPTION OF THE DRAWINGS

The novel features of this invention, as well as the invention itself, will best be understood from the accompanying description taken in connection with the accompanying drawings wherein like characters refer to like parts and in which:

FIGS. 2 and 3 are sectional views taken along lines 2—2 and 3—3, respectively, of FIG. 1;

FIGS. 4 and 5 are front and side views (shown at different scales), respectively, of a liquid crystal display panel in accordance with the invention;

FIG. 6 is a plan view of the front surface of the back plate of the panel of FIGS. 4 and 5;

DESCRIPTION OF THE PREFERRED EMBODIMENTS

Figure 1:
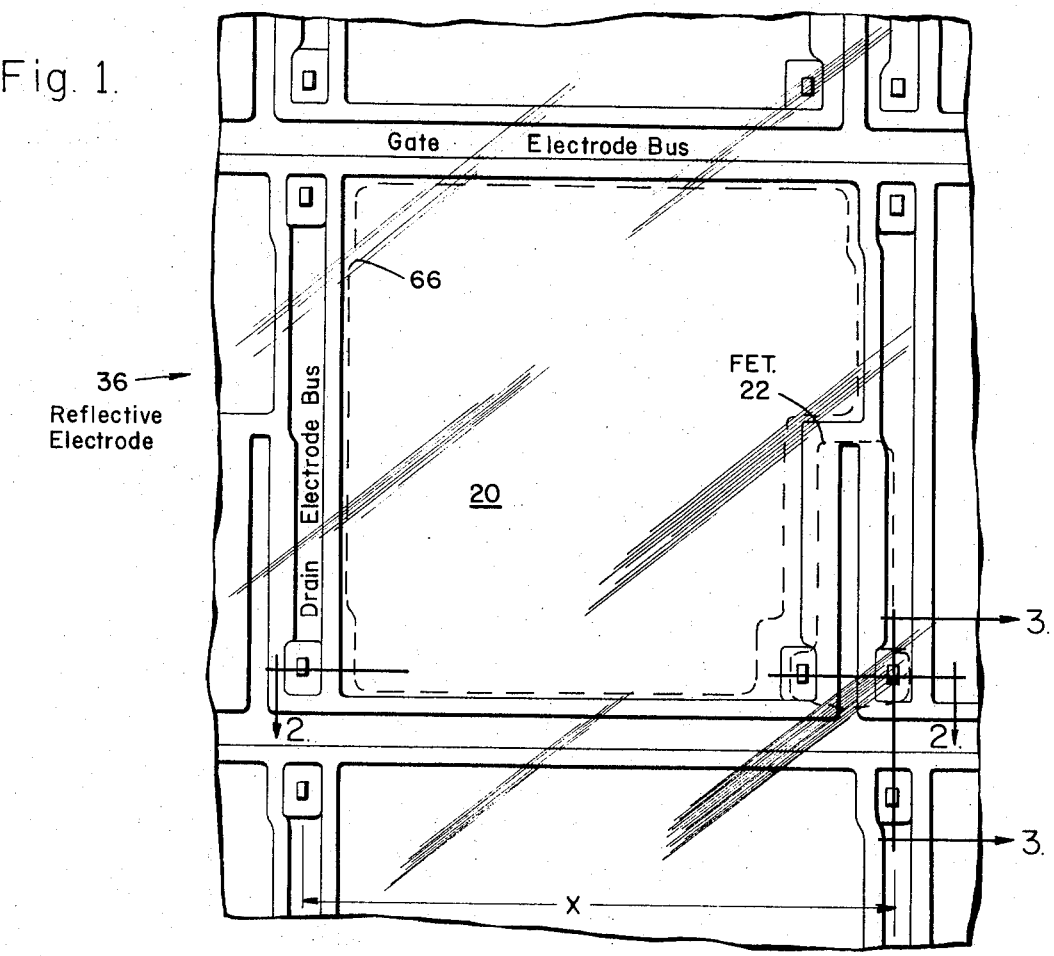
FIG. 1 is a plan view of a portion of a liquid crystal display panel showing one liquid crystal cell and portions of contiguous cells for describing the integrated circuitry of the display system in accordance with the subject invention.

Before describing the elemental liquid crystal cell shown in FIGS. 1 through 3, the structure and operation of a matrix array of such cells, i.e., a display system, will first be described with reference to FIGS. 4 through 7. As there shown, a liquid crystal display panel 26 is formed by sandwiching a thin layer of liquid crystal material 28 between a glass plate 30 which has a transparent electrode 32 covering one surface, and a back plate 34 which has a matrix array of reflective electrodes 36 formed thereon. The individual addressing and storage circuits for each cell (not shown in FIGS. 4 through 7) are formed contiguous to the reflective electrodes 36.

Transparent electrode 32 may be formed by depositing a very thin layer of indium or tin oxide or similar type material on the rear surface of optically flat glass plate 30. The transparent electrode so formed acts as a common electrode for all of the individual cells. In the disclosed embodiment front plate electrode 32 is AC grounded, and it therefore also provides a radio frequency interference (RFI) shield for the display.

Figure 7:
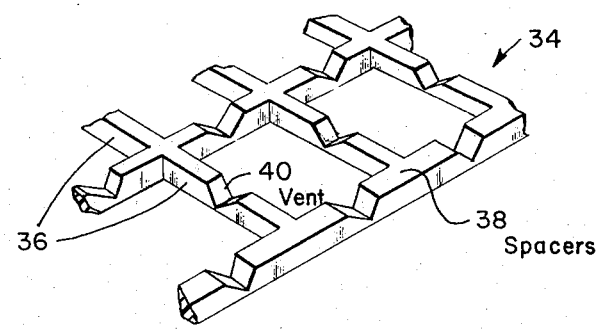
FIG. 7 is an isometric view of a portion of the front surface of the back plate of FIG. 6.

Liquid crystal material 28 fills the void formed by spacers 38 between the front glass plate 30 and the back plate 34, such that in the assembled panel the liquid crystal material may be ½ to 1 mil thick, for example. FIG. 7 shows a much enlarged view of portion of the front surface of back plate 34, wherein spacers 38 are more clearly depicted. Preferably these spacers are disposed between reflecting electrodes 36 of the various cells, and they may be formed by the application of permanent insulating coating (preferably evaporated or sputtered). However, the spacers could comprise flexible polymer disposed along the perimeter of the panel. The edges of the panels may be sealed by means of paraffin wax or an epoxy of resin, for example, as indicated by seal 42 of FIG. 5.

The vents 40 (FIG. material in the walls of spacers 38, aid in the filling of the panel with liquid crystal material. It is noted that commonality of the liquid crystal material between cells does not interfere with the operation of the display panel because the high viscosity of the material prevents the scattering centers from migrating significantly before they dissolve. Filling of the panel with liquid crystal material may be accomplished by creating a partial vacuum at one end of the panel through a hole (not shown) in seal 42 and applying the liqud crystal material through a filling hole (not shown) at the opposite end thereof. After the panels have been filled with the liquid crystal material, the filling holes may be "pinched off" or sealed with epoxy.

Any suitable liquid crystal material may be used in the panels of the subject invention. For example, N-(p-methoxybenzlidene)-p-n-butylaniline (MBBA) is a widely used nematic liquid crystal having an acceptable operational temperature range. It has been found that good dynamic scattering mode (DSM) characteristics are obtained from MBBA material containing 2.3 percent cholestone and 1 percent of a zwitterion dopant. In the dynamic scattering mode of operation, such as for television type displays, the long term stability of scattering centers in the absence of applied control voltages is not required. On the contrary, the rapid decay of scatter centers after a preselected time period, such as 30 milliseconds, is desired in this type of application. However, it is noted that the display panels of the subject invention are applicable to a wide range of uses which include storage mode operation, such as for computer readout systems, for example, as well as the dynamic scattering mode operations.

It is noted that in FIG. 6 the 16 × 16 matrix of elemental cells is shown at approximately 20 times their actual size for clarity of illustration, and that in an actual panel many more elements would be used, such as a 1,000 × 1,000 matrix, for example. In fact, one of the primary objectives of the subject invention is to provide the circuitry and techniques for extending the matrix concept to a very large number of elemental cells, and display panels comprising many millions of individually controllable elemental cells are possible in accordance with the subject invention.

Figure 8:
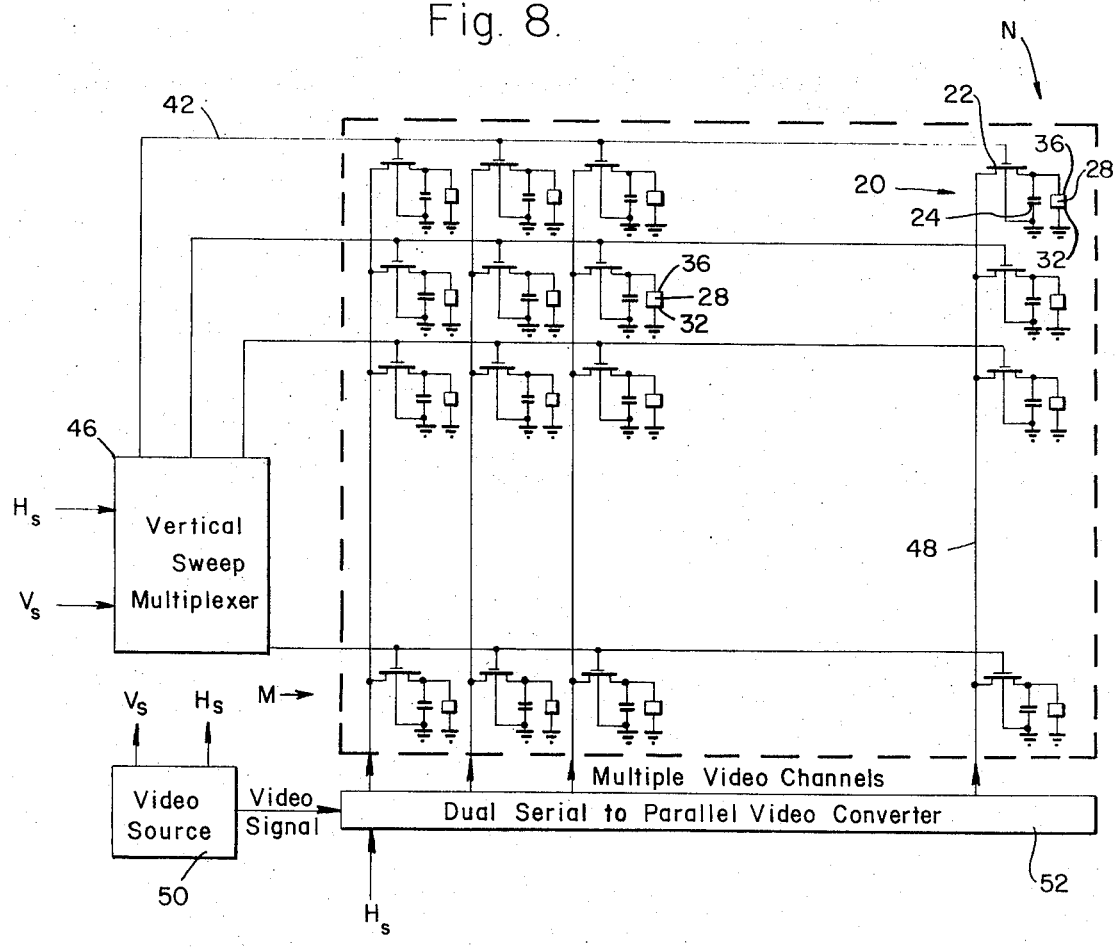
FIG. 8 is a schematic and block diagram useful for describing one addressing format compatible with the display panels of the subject invention.

Reference is now directed to the electrical schematic and block diagram of FIG. 8 which illustrates one display panel addressing format which could be used for presenting conventional television type imagery. As shown in FIG. 8, the individual liquid crystal cells are arranged in a matrix of M rows and N columns. Associated with each cell, in addition to the liquid crystal material 28 sandwiched between electrodes 32 and 36, is a field effect transistor (FET) which is designated generally by the reference numeral 22 and a capacitor which is designated generally by reference numeral 24.

Capacitor 24 and FET 22 formed an elemental sample and hold circuit which functions to "stretch" addressing pulses, which could be 30 microseconds in duration, for example, to pulses of 1 millisecond durations needed to effectively energize the liquid crystal material. As shown in FIG. 8, each FET is of the correct type and is so connected that when the gate is driven negative, the FETs turn on and the associated capacitor 24 is connected to a column electrode bus, such as column electrode bus 48, for example. When the gate drive voltage is removed (the gate to drain voltage returns to zero or becomes positive), all capacitors 24 of the corresponding row are disconnected from the column bus by the high off resistance of the field effect transistors. In this manner each of the capacitors 24 in any given column is separated from the other capacitors in that column. Since the gates of all FETs 22 in any one row are connected together by a gate electrode bus, such as bus 42, for example, the placement of an enable signal on any given gate electrode bus causes all the storage capacitors for that given row to be loaded with video data that is then present on their corresponding column electrode buses.

The synchronous line-at-a-time loading of new video information into all the elements in a given row requires the video information to be present in parallel synchronous form on all the column electrode buses; i.e., the video cannot be scanned or switched from one column to the next as the video on all columns must be simultaneously valid and independent of video on the other columns.

It is noted that contrary to a conventional cathode ray tube system wherein each element is addressed by an electron beam that scans in two directions, the liquid crystal display addressing format of FIG. 8 permits scanning in only one direction. As shown in FIG. 8, vertical sweep multiplexer 46 provides the ordered scan by driving the gate electrode buses. Multiplexer 46 may be implemented by driving the gate electrode buses from the parallel outputs of a shift register, for example. The video signals are applied in the format required for conventional television scanning by means of a dual serial to parallel video converter 52.

Considering the vertical sweep multiplexer 46 in more detail, this circuit may consist simply of a serial input, parallel output shift register and associated drivers for each row electrode bus of the display arranged such that a single "1" in a whole field of "0's" is shifted through the shift register to scan each field. For an exemplary case of a 1,024 line display which is refreshed 30 times per second, the basic clock rate of the shift register would be 1,024×30, or approximately 30 KHz. The gate drive voltage change must be greater than the peak-to-peak video drive signal which is applied to the liquid crystal cells 20. In the subject embodiment of the liquid crystal cells, the video swings required to excite the liquid crystal material to maximum scattering capability (maximum brightness) could be approximately 20 volts, for example.

If the FETs have a voltage threshold of 4 volts, for example, the gate voltage drive of 24 volts would be required. If the vertical sweep multiplexer 46 is implemented by means of an LSI (large scale integration) shift register, its output voltage would be in the order of 3 to 4 volts and hence the requirement for a driver or buffer amplifier for each row bus. Such a buffer amplifier would have a 24 volt output swing with a sufficiently high gain bandwidth product and power drive capability to provide a fairly good line drive pulse. Buffer amplifiers or drivers having a slew rate of approximately 10 volts per microsecond when loaded with the characteristic row electrode bus capacitance would provide a satisfactory switching time for applications in which the desired addressing time is approximately 30 microseconds.

Before explaining the operation of the dual serial to parallel video converter 52 in greater detail, it may be helpful to first consider the operation of a single serial to parallel analog converter. Such a circuit functions in an analogous manner to a conventional serial to parallel digital converter with the exception that the magnitude (analog nature) of the signal is preserved. A serial to parallel converter takes sequentially presented data and stores it in a series of data bins which can be interrogated in parallel. The simplest serial to parallel analog converter consists of a set of sample and hold circuits with one sample and hold circuit for each of the parallel output channels, and a shift register to sequentially enable the sampling function. Such a circuit can be used to store one line of conventional video data by providing a sample and hold circuit for each liquid crystal cell in the display.

Simultaneous examination of the video data requires that there be a pause in the accumulation (sampling process). Long pauses in the input serial data would be wasteful of the video data channel capability and the available pause between blocks of television type data is too short for data transfer to the addressing circuits. Therefore, two serial to parallel video converters are utilized in the embodiment of FIG. 8 so that the applied video may be continuously processed.

Figure 9:
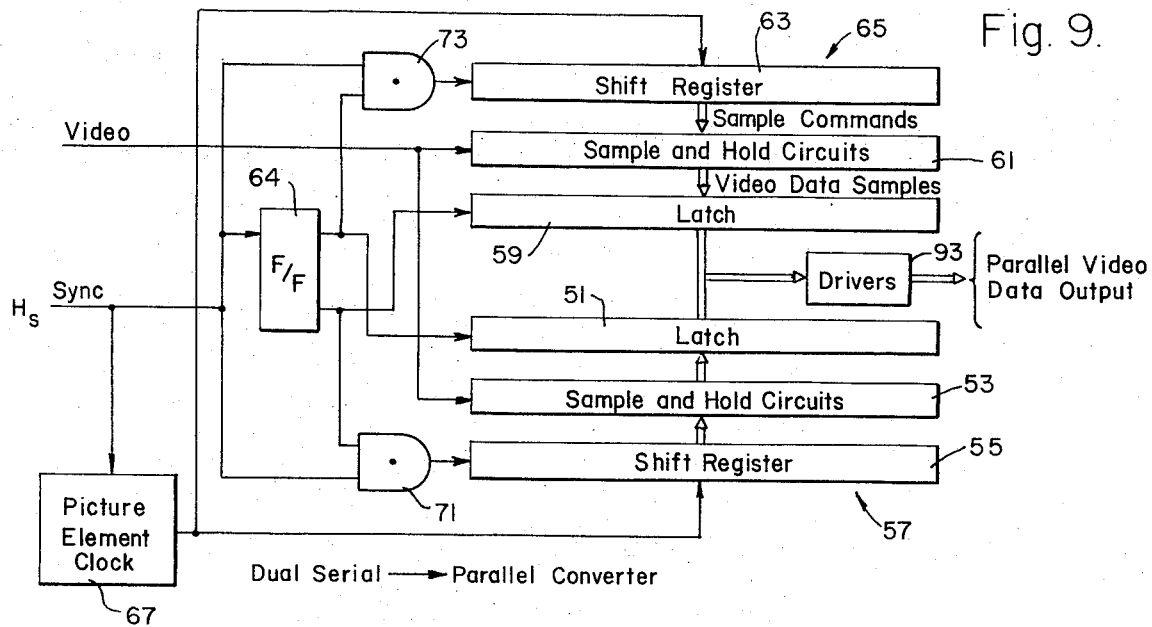
FIG. 9 is a block diagram of the dual serial to parallel converter shown in FIG. 8.

One suitable implementation for dual serial to parallel converter 52 is shown in FIG. 9. As there illustrated, latch, sample and hold, and shift register circuits 51, 53, and 55, respectively, form a first single serial to parallel video converter 57, and latch sample and hold and shift register circuits 59, 61, and 63, respectively, form a second single serial to parallel video converter 65.

Considering single serial to parallel video converter 57, a clock source 67 which is synchronized by the horizontal synchronization pulses from video source 50 (FIG. 8) and which operates at a rate compatible with the display rate of the liquid crystal panel, clocks the shift register 55 whose outputs control the sampling function of sample and hold circuits 53. A flip flop 64 and gates 71 and 73 control which single parallel video converter (57 or 65) is operably coupled to apply the stored video to the output drivers 93. The flip flop 64 is toggled by the horizontal sync pulses applied from video sources 50 (FIG. 8) and hence successive horizontal lines of applied video is processed by alternate ones of the converters 57 and 65. Latch circuits 51 and 59 are enabled by different ones of the two output circuits of flip flop 69 such that while one video converter is sampling a currently applied horizontal line of data the other video converter has the output circuits of its latch circuit coupled to the column electrode buses as shown in FIG. 8. In this manner a continuous feed of video information may be accumulated and while one converter is loading previously accumulated video data into the display in a parallel format, the other converter is accumulating the next line of data.

Figure 10:
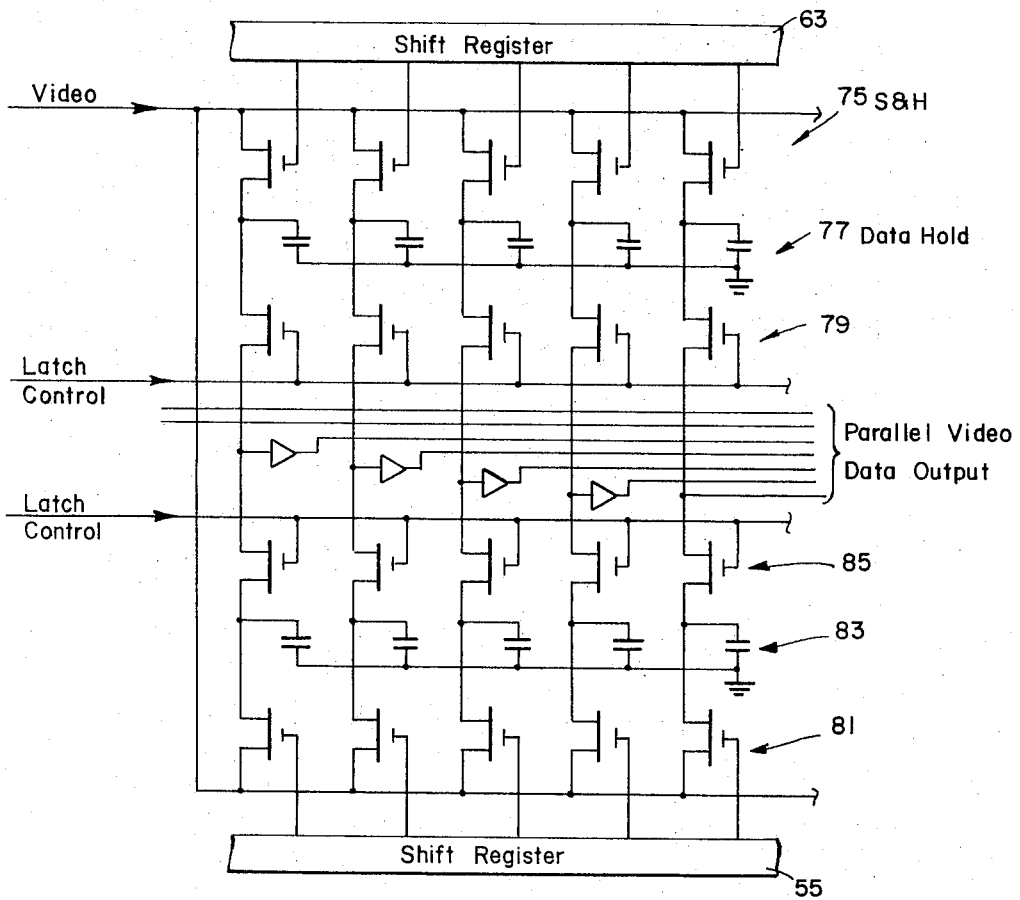
FIG. 10 is a schematic and block diagram of a portion of the converter of FIG. 9.

A portion of dual serial parallel video converter 52 is shown in greater detail in FIG. 10. As there shown, sample and hold circuits 61 (FIG. 9) are implemented by FET sampling switches indicated generally by reference numeral 75 and data holding capacitors indicated generally by reference numerals 77. The operation of the converter is such that the incoming video data is continually sampled at the picture element rate with the exception of the short time period that is reserved for the horizontal retrace required in the conventional cathode ray tube display. The dual serial parallel converter 52 alternates the input sampling and data output roles with the transition between roles taking place during the conventional horizontal retrace period. The input sampling is sequenced by the shift registers 55 and 63 so that the input video data line is sampled by the first sampling switch 75 at the time interval when the video data for the first column is occurring and this procedure is repeated in a similar manner for the data for the following columns. The data holding capacitors, such as 77, are correspondingly connected such that the one containing the information of the first column is connected to the column electrode bus of the first column when the latch circuits are activated, and this procedure is repeated in a similar manner for the other columns. The requirement to accumulate one line of data before new data can read out in parallel form introduces a converter delay of one line time (typically several microseconds), but this need not degrade system performance. In this manner a continuous feed of video information can be accumulated, while one converter is loading the previously accumulated video data into the display in a parallel format, the other converter is accumulating the next line of data. Single serial to parallel converter 57 is implemented by units 81, 83, and 85 shown in the lower portion of FIG. 10, in a manner analogous to that described above for units 75, 77, and 79, respectively.

Again referring primarily to FIG. 8, storage capacitors 24 maintain the potential across the individual liquid cells 28 during the interval of time between when the field effect transistor switches 22 have been turned off so that another row of cells may be addressed, and the time that the scattering centers are formed in the liquid crystal material. For example, with the liquid crystal material listed hereinabove there is approximately a 5 millisecond delay, with an applied potential of 20 volts, between when the field is applied across the individual liquid crystal cell and the formation of the scattering centers within the cell. This 5 millisecond delay could be considered as an image developing time and once the scattering centers have been formed, they will remain for a period of approximately 30 milliseconds, for example. The scattering centers retention time could be considered similar to the phosphor persistance in a conventional cathode ray tube system. Hence, if the display is refreshed at a 30 Hz rate, the individual cells can be addressed every 33.3 milliseconds, and a new set of scattering centers will be formed almost immediately after the previous set has decayed.

An important aspect of the subject invention relates to the circuitry and fabrication techniques for forming field effect transistor 22 and capacitor 24, as well as the reflective electrode 36, associated with each cell 20 of the panel as an integral part of the semiconductor back plate 34. FIG. 1, to which reference is now primarily directed, shows an enlarged view of one elemental cell and portions of contiguous cells for explaining the structure and fabrication thereof. The reflective electrode 36 which contacts the liquid crystal material may be aluminum, nickel, chromium, gold, or silver deposited by standard evaporation or sputtering techniques. The chromium electrode may be preferred from an extended system life point of view, inasmuch as chemical degradation of the system is retarded thereby.

The boundary of capacitor 24, which is formed beneath the reflective electrode 36, is depicted by a closed curve 66 on FIG. 1. It is noted that cell 20 is shown in FIG. 1 at a greatly magnified scale, such as 400 times actual size, and views 2 and 3 are not necessarily to scale, as portions thereof were altered to improve the clarity of the illustrations. To provide an indication of the actual scale of liquid crystal display cells in accordance with the invention, dimensions X between adjacent drain buses in FIG. 1 might be 10 mils, for example.

Figure 2:
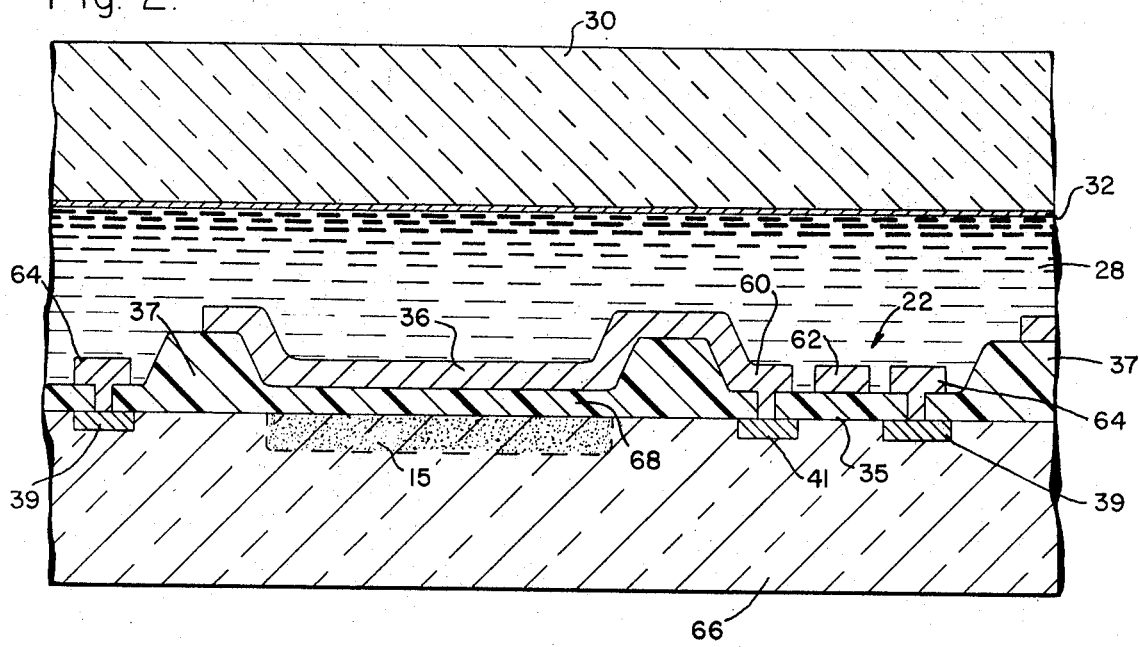

Reference is now directed to FIG. 2 which shows capacitor 24 as comprising metal electrode 36 separated from an $n^+$ doped region 15 (grounded) on a silicon substrate 66 by a dielectric layer 68. The dielectric layer preferably may be silicon dioxide ($SiO_2$) or silicon nitride ($Si_3N_4$) or combination of both. Metal reflective electrode 36, dielectric layer 68 and the $n^+$ doped region 15 may be 8,000A, 1,200A, and 2,000A, respectively, in thickness. It is noted that without the $n^+$ region 15 formed in the silicon substrate 66, the value of capacitance of element 24 is very much dependent on the applied voltage. This voltage dependence is undesirable since the storage time would also be a function of the applied voltage. The heavily doped $n^+$ region 15 makes the capacitance of capacitor 24 substantially voltage independent.

The $p$ channel enhancement type field effect transistor devices shown in FIGS. 1 through 3 comprise a gate 62, a drain bus 64, and source contact 60. Drain and source regions 39 and 41, respectively, are formed as $p^+$ regions in the silicon substrate. It is noted that the metal reflective electrode 36 is in physical contact with the source contact 60.

The structure for forming the drain bus 64 beneath the gate bus is depicted in greater detail in FIG. 3. As there shown, a $p^+$ doped region 72 allows for the continuity of drain bus 64 under the gate bus, and the back bias PN junction provides insulation between the drain electrode and the silicon substrate.

Back plate 34 may be fabricated by using the following standard metal oxide silicon (MOS) processing steps:

1. The thick oxide is grown (e.g., see region 37 of FIG. 2).
2. Holes are etched for the $n^+$ diffusion using standard photolithography and etching techniques.
3. The $n^+$ regions are formed by diffusion.
4. Holes are opened for the $p$-diffusions.
5. The p-regions are formed by standard diffusion techniques.
6. The thick oxide is removed from the areas which will be thin oxide (e.g., regions 68 and 35 of FIG. 2).
7. The thin oxide is grown.
8. Contact holes to the $p$-diffusions are opened.
9. Metal is deposited and etched.

As illustrated in FIGS. 2 and 3, almost all the area is active, with a minimum amount taken up by the field effect transistor and addressing buses. Also, the thin oxide for insulating gate 62 and for the insulation layer of capacitor 24 may be formed during a single processing step.

One of the advantages of the integrated semiconductor wafer construction in accordance with the subject invention is the ability of using integral spacers (38 of FIG. 7) which can be formed as part of the matrix for spacing the transparent electrode 32 (FIG. 5) from the reflective electrode 36, instead of the more conventional spacing technique which uses narrow strips of insulating material (like mylar) surrounding the entire display. This former method assures a more uniform spacing than one that applies the spacers only at the circumference of the array panel. To maintain the clarity of FIGS. 1 through 3, the spacers 38 (see FIG. 7) were not shown. However, the fabrication of these spacers was described hereinabove relative to FIG. 7, and it is noted that except for connecting leads (i.e., drain and gate buses) these spacers should be kept outside of the electrode areas (36) of the display cell. Also, it is noted that all the addressing buses running across the display, as well as the elements necessary for proper addressing (e.g., FET 22), can be isolated from the cells. This may be accomplished by covering all the addressing elements and buses with a thin insulator, such as a 500A layer of silicon dioxide.

According to a second preferred embodiment of the invention, ion implantation rather than diffusion is used to form the $n^+$ doped region 15 (one element of capacitor 24). Photoresist or metal may be used to protect all areas where ion implantation is undesired. The implantation step may be performed following the growth of the thin oxide, and for p-channel devices as illustrated in FIGS. 1 through 3, implantation of phosphorous ions is preferred inasmuch as this provides a doped $n^+$ region which is in good contact with the $n$ substrate. Ion implantation has the advantage of being a low temperature doping operation and the dielectric layer 68 of the capacitor can be controlled much better on a substrate area that has not been exposed to a diffusion, and ion implantation allows the doping of the substrate after the dielectric layer has been formed.

According to an additional embodiment, the reflective electrodes may be fabricated by depositing a doped polysilicon rather than a metal. Although optical characteristics of the polysilicon are inferior to the metals, the polysilicon is easier to deposit, and its use simplifies fabrication steps.

Thus having described a new and useful liquid crystal display system having integrated addressing and signal storage circuitry, what is claimed is:

1. A liquid crystal display panel for providing a pictorial display in response to control signals and video signals applied thereto, said display panel comprising:
   a transparent electrode plate adapted for being biased to a preselected electrical potential level;
   a semiconductor backplate disposed adjacent to and spaced apart from said transparent electrode plate;
   a quantity of liquid crystal material disposed in the spacing between said transparent electrode plate and said semiconductor backplate;

a plurality of substantially parallel, equally spaced, conductive gate buses on the surface of said semiconductor backplate which is nearer said transparent electrode plate;

a plurality of substantially parallel, equally spaced conductive drain buses on said surface of said semiconductor plate, said drain buses being orthogonal to and electrically insulated from said gate buses, whereby a cell area is defined where each adjacent pair of drain buses are intersected by a pair of adjacent gate buses;

an insulation layer over each said cell area of said semiconductor backplate;

an array of light reflective electrodes with a different one of said reflective electrodes being disposed on top of the insulation layer for each of said cell areas such that the combination of each said reflective electrode and the contiguous portion of the semiconductor backplate underneath said insulation layer possesses electrical characteristics analogous to those of a capacitor;

a plurality of field effect transistors with different ones of said field effect transistors being disposed in a particular corner of each cell area, each said field effect transistor having a gate element disposed between a source element and a drain element and with each gate element being electrically connected to the adjacent gate bus, each drain element being electrically connected to the adjacent drain bus and each source element being electrically connected to the reflective electrode of the associated cell area; whereby all of the gate elements for each row of said cell areas are electrically coupled together and all the drain elements of all said cell areas of each column are electrically coupled together, and in response to the sequential application of control signals to each of said gate buses and to the parallel application of said video signals to each of said drain buses, the potential of each reflective electrode may be rapidly programmed in accordance with a given pictorial format.

2. The display panel of claim 1 further comprising an array of doped regions in said semiconductor backplate, with each of said regions disposed underneath of and electrically insulated from a corresponding one of said reflective electrodes, and with each said region being heavily doped with majority carriers; whereby the combination of each reflective electrode and its associated doped region possesses electrical characteristics analogous to a two plate capacitor.

3. The display panel of claim 1 further comprising an array of doped regions in said semiconductor backplate, with each of said doped regions disposed underneath of and electrically insulated from a corresponding one of said reflective electrodes, and with each said regions being heavily doped with majority carrier ions; whereby the combination of each reflective electrode and its associated doped region possesses electrical characteristics analogous to a two-plate capacitor.

4. The display panel of claim 1 wherein said reflective electrodes are doped polysilicon electrodes.

5. The display panel of claim 1 further comprising multiplexer means for sequentially applying said control signals to each of said gate electrode buses; and serial to parallel video converter means for applying video signals to each of said drain buses during each period a control signal is applied to one of said gate electrode buses.

6. The display panel of claim 1 wherein said reflective electrodes are chromium electrodes.

* * * * *